June 17, 1941.  H. T. LAMBERT  2,245,988
BRAKE MECHANISM
Filed July 29, 1940  2 Sheets-Sheet 1
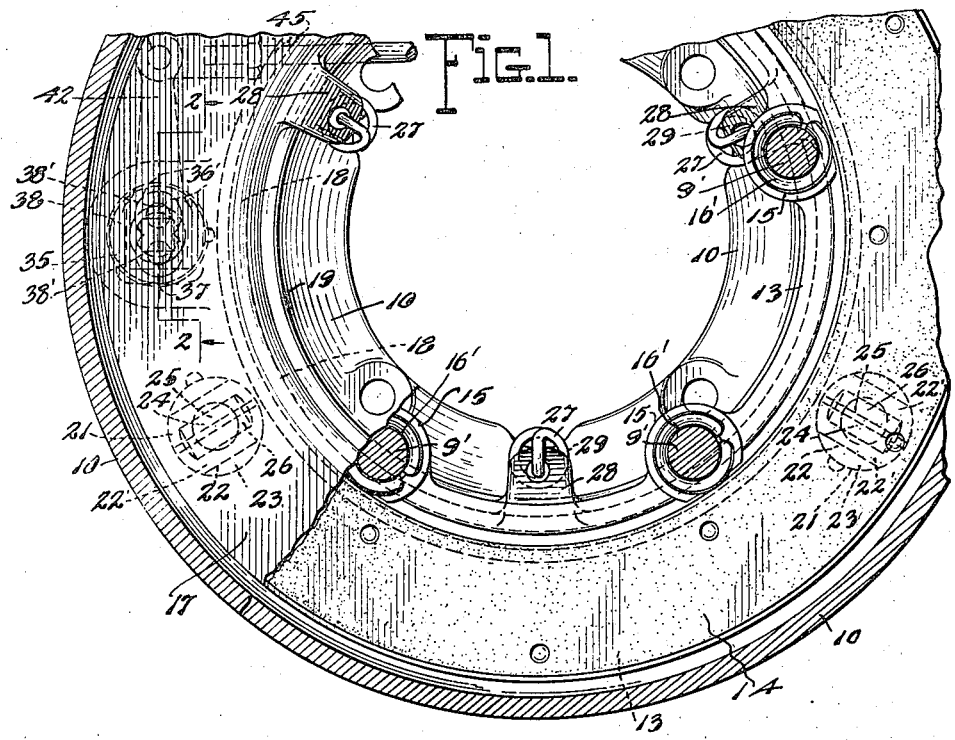
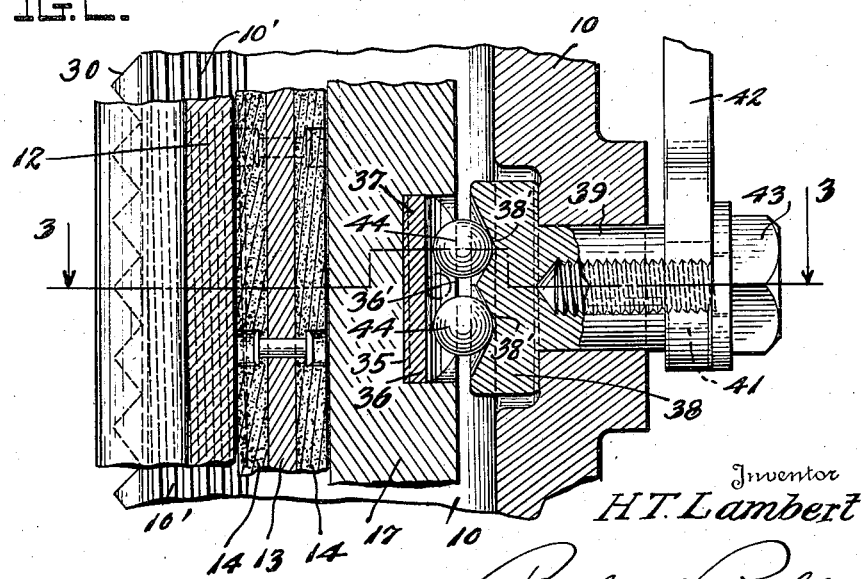
Inventor
H. T. Lambert
By Robb & Robb
Attorneys

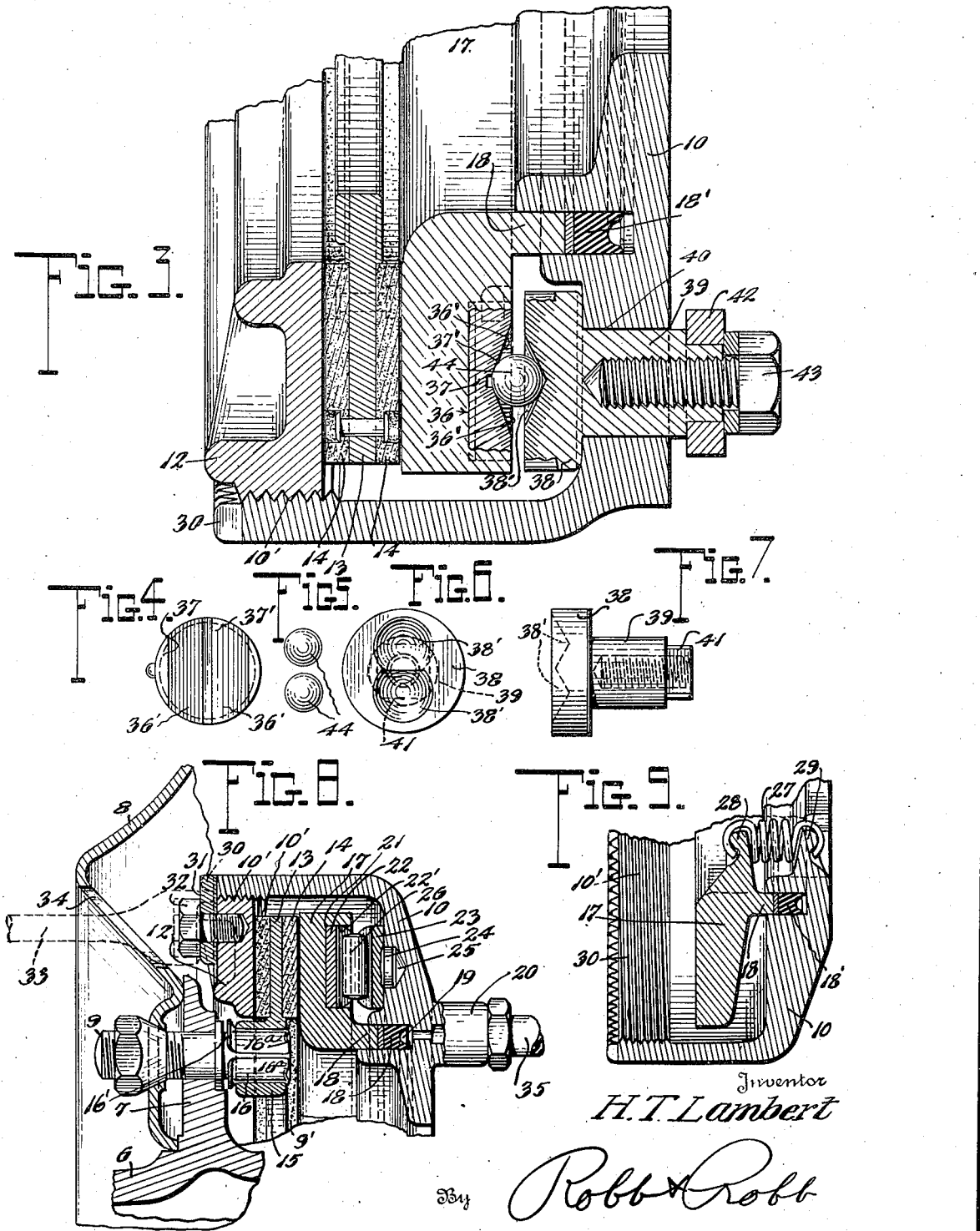

Patented June 17, 1941

2,245,988

UNITED STATES PATENT OFFICE 2,245,988

BRAKE MECHANISM

Homer T. Lambert, St. Joseph, Mich.

Application July 29, 1940, Serial No. 348,254

6 Claims. (Cl. 188—72)

The present invention relates to improvements in brake mechanism designed particularly for use on motor vehicles. Specifically, the invention appertains to a novel parking or emergency brake more especially applicable to a disc type of brake construction.

It is well known that in a number of States, regulations require that in addition to the usual service or foot brake there shall be provided an independent emergency or parking brake, and it is the object of this invention to provide a simple and effective manually operative arrangement complying fully with these requirements, for the type of brake referred to.

It is further an object of this invention to provide a brake mechanism embodying in combination with a pressure plate, a pair of insert discs having grooves or recesses and inclined surfaces to cooperate with interposed rolling members, by means of which axial pressure may be imparted to the pressure plate upon movement of one of said discs relatively to the other and independently of the main brake.

Other and further objects and advantages of the invention will be hereinafter set forth and the novel features thereof defined by the appended claims.

In the accompanying drawings—

Figure 1 is a fragmentary vertical sectional view of a brake construction to which my present invention is applied;

Figure 2 is an enlarged vertical sectional view taken about on the plane indicated by the line 2—2 of Figure 1;

Figure 3 is an enlarged sectional view on the plane indicated by the line 3—3 of Figure 2.

Figures 4 to 7 are detail views of the disc and rolling members constituting the primary energizing means of this invention, and Figures 8 and 9 are enlarged sectional views of the upper and lower parts respectively of the brake construction showing more clearly the details of the brake unit and its relation to the wheel of the vehicle.

Like reference characters designate corresponding parts in the several figures of the drawings.

Referring to the drawings, the brake construction embodying this invention is associated with the wheel hub 6 to the supporting flange 7 of which the vehicle wheel 8 is demountably attached by the stud bolts 9 having the inner extensions 9' projecting into the drum housing 10.

The brake assembly unit is mounted upon the axle support for the wheel (not shown) in the manner disclosed in my copending application, Serial No. 322,027 filed March 2, 1940, and in which it is fully described and claimed, exclusive of the auxiliary emergency and parking brake of this application. For the purposes of the present disclosure, the construction will be briefly set forth herein.

The drum housing 10 is threaded internally at 10' to receive the brake disc 12 which in turn is correspondingly threaded exteriorly for adjustment inwardly and outwardly of the drum housing 10.

Within the drum the rotary brake ring 13 is mounted upon the inner extensions 9' of the stud bolts 9, said ring carrying a friction lining or surface material 14 at each side. The ring is formed with a series of bearing lugs 15, each provided with an aperture to receive the extensions 9' serving to guide the ring and impart rotation thereto.

In order to facilitate the axial sliding movement of the ring, a metallic thimble bushing or spring ferrule 16 is disposed in each opening of the driving lugs 15. The construction of this ferrule is clearly shown to comprise a split sleeve, normally tapered longitudinally and having a flange 16' at one end and spaced upset protuberances 16a at the other end. As the ferrules are introduced into the openings of the lugs 15, the spring metal sleeve is compressed until the walls assume a substantially parallel position tending to hold the ring 13 in a true vertical position and insure free self-adjusting sliding movement upon the extensions 9' at all times and a full face to face contact of the ring faces with the adjacent parts during braking operation. This particular form of bushing eliminates the necessity of employing yieldable rubber bushings which have a tendency to become inoperative and interfere to a certain extent with the free sliding movement of the brake ring.

Within the housing 10 at the side of the ring 13 opposite the brake disc 12 is arranged a free floating pressure plate 17 formed with the laterally extending annular flange 18 extending into an annular recess 19 in the inner face of the drum housing.

Since the brake construction herein described is of the hydraulic type, the flange 18 constitutes a piston and the recess 19 its cylinder. A channeled sealing reinforced rubber ring 18' cooperates with the flange 18 and the pressure medium is admitted to the cylinder through the nipple 20 so as to actuat the pressure plate 17 to move it axially until it contacts with the rotary brake ring 13, thereupon picking up rotation of the latter when the vehicle is moving and setting up servo action by instrumentalities now to be described.

As will be clearly seen by reference to Figure 3, the pressure plate 17 in one face is provided with a plurality of circular recesses 21 (one only appearing in this view, but preferably three of such recesses are formed) and in each of these recesses is fixed a hardened steel insert 22 having a transverse substantially V-shaped groove 22' therein. Each of such inserts is faced with a substantially corresponding insert 23 rotatably mounted on the inner face of the drum housing 10 by means of a centralizing boss 24 seating in a recess 25. This construction of insert I have found desirable for those that are intended to rotate, as there is less tendency for them to freeze or stick in their seats, and they produce less friction.

Between each pair of these discs is a roller 26 seating in the insert grooves. It will be understood that balls in conical recesses may be substituted for the roller arrangement illustrated, and, therefore, I do not wish to be restricted as regards the form of this energizer means.

Under normal conditions, the pressure plate 17 is held away from the braking ring 13 by means of the tension springs 27, each of which is connected at one end to a lug 28 on the plate, and at its other end to a corresponding lug 29 formed on the housing 10 in opposed relation to the lug 28. Any number of these tensioning elements may be employed for the purpose stated. It will also be obvious that spring arrangements of different form may be employed and arranged to coact with the pressure plate to function in the same manner as the springs 27, and, for this reason, I do not wish to be restricted to the particular type of tensioning means shown in the drawings.

As hereinbefore described, the brake disc 12 is screwed into the open end of the drum 10 to the proper position for cooperation with the braking ring 13. This mounting of the brake disc enables adjustment of this element for clearance between the braking parts, and once the adjustment has been obtained, the position of the brake disc 12 is maintained by a special locking feature which is now to be described. As shown clearly in Figure 3 of the drawings, the peripheral face of the drum housing 10 is notched to provide a series of locking teeth 30 extending completely about the drum edge. A locking plate 31 having at its free end teeth corresponding to the teeth 30 is secured by means of a bolt 32 passing through an aperture in its other end to the brake disc 12 having a threaded aperture therein to receive said bolt. In order to take up wear of the braking parts and maintain a proper clearance adjustment between the same, the locking plate 31 is released from the engagement of its teeth with those on the drum 10 by backing out the bolt 32. For this purpose, an implement in the nature of a socket-wrench 33 is introduced through an opening 34 in the wheel and engaged with the head of the bolt 32. By taking hold of the wheel after the bolt has been backed out sufficiently far to establish a clearance between the interengaging teeth, the brake disc 12 may be rotated inwardly or outwardly, as the case may be, by the turning action of the wheel itself. Thus, through the wrench or implement 33 a connection is established between the wheel and the brake disc 12 to produce the rotative movement, and due to the leverage which is provided by the wheel, the adjustment of the brake disc in the manner described is greatly facilitated, and without the necessity of removing the wheel for such purpose. After the adjustment has been reached, the wrench is then operated to reengage the locking plate 31 and secure the same in a tightened position for preventing any further movement of the brake disc during the normal operation of the braking elements.

The operation of the service brake portion will be clear from the foregoing description, and it suffices to say by way of summary that, when service brake application is to be obtained, the pressure medium is admitted to the brake unit through the conduit 35 to act against the piston flange 18 of the pressure plate 17. The pressure moves the pressure plate into contact with the friction surface of the rotating brake ring 13, and thereupon the rotative movement of this part is picked up by the pressure plate. Slight rotary movement of the last-named plate causes the rollers 26 to climb up the cam faces of the insert elements 22 and 23 to thereby cause further axial movement of the pressure plate against the braking ring 13, which is axially moved also to contact with the brake disc 12 and provides the necessary braking action of the parts. Upon relief of the hydraulic pressure, the tension of the springs 27 pulls the pressure plate 17 away from the braking ring 13 and normalizes the brake construction. This braking operation, by virtue of the construction of the self-energizing parts, may be obtained in either direction of movement of the vehicle. The simplicity of the construction and arrangement of the parts, the accessibility of the same, and the facility with which adjustment may be secured to take up wear are of prime importance in the advantages attributable to these particular brake improvements.

Now referring to the construction of the auxiliary brake features, shown most clearly in Figures 2 to 7, the pressure plate 17 is formed adjacent its periphery with a circular recess 36 in which is fixedly secured a disc 37 having a transverse groove 37' with oppositely inclined camming surfaces 36', all similar to the construction of the energizing discs or inserts 22 heretofore described.

A second disc 38 is rotatably mounted in opposed relation to its companion disc 37 in the drum housing 10 by means of its shank 39 which is of sufficient length to project through the opening 40 and is formed with the squared terminus 41. Upon said extremity is secured the lever arm 42, as by means of the bolt 43.

The inner face of the disc 38 is formed with a pair of conical recesses 38' providing seats for a pair of anti-friction balls 44 normally resting in the base of the groove 37' in the disc insert 37.

A brake rod 45 is connected to the lever 42 and leads to a manual brake lever (not shown) arranged convenient to the operator of the vehicle.

From the foregoing it will be understood that the pressure plate may be shifted, not only by the main hydraulic means, for service application of the brake, but also independently by the auxiliary actuating means, in emergency or parking brake application as will now be set forth. For parking, after the vehicle has been stopped, the lever 42 is actuated by the brake lever, thereby causing the disc 38 to rotate and the ball members to ride upon the camming surfaces 36' of the disc 37, one ball up one surface and the other ball up the other surface. This action presses the plate 17 firmly against the rotary ring 13 and it in turn against the stationary brake member 12, locking the vehicle against movement.

In the event the hydraulic service brake should become inoperative for one reason or another, while the vehicle is moving, the manual brake lever may be shifted as described above, resulting in contacting of the plate 17 with the rotating ring 13, thus imparting slight rotary movement to the plate 17 and automatically setting into operation the energizing means 22, 23, 26 to effect servo action. As soon as the brake is released, the spring means 27 withdraws the plate 17 to normal position, returning also the rolling means 44 to the base of the groove 37'.

An important factor in this brake construction is the arrangement of the disc 37, which its groove disposed in such position that, when the brake is operated during movement of the vehicle and the plate 17 is slightly rotated by its contact with the rotary member 13, the balls 44 will move slightly longitudinally of the groove 37' to accommodate for the relative movement of the parts. The use of the rolling members 44 for camming purposes materially reduces the friction of the camming instrumentalities.

While the specific details of construction have been herein shown and described, the invention is not confined thereto as alterations may be made without departing from the spirit thereof as defined by the appended claims.

Having thus described my invention, what I claim as new and desire to secure by Letters Patent is:

1. Brake mechanism for vehicles of the class described comprising in combination, a support, a plurality of braking members mounted thereon, primary means operable directly upon one of said braking members for shifting the same into contact with the others to produce brake application, auxiliary means for actuating said last-mentioned braking member into brake relation comprising a pair of discs having camming surfaces, anti-friction elements between said discs, one of said discs being rotatably mounted upon the support and the other disc being fixedly mounted on the said braking member, and means for rotating one disc relative to the other, and independent energizing means for producing servo action upon brake application during movement of the vehicle.

2. Brake mechanism for vehicles of the class described comprising in combination, a support, a plurality of braking members mounted thereon, primary means for shifting one of said members into contact with the others to produce brake application, auxiliary means for actuating said members into brake relation comprising a pair of discs having camming surfaces, anti-friction elements between said discs, means for rotating one disc relative to the other, and independent energizing means for producing servo action upon brake application during movement of the vehicle, said anti-friction elements of the auxiliary actuating means comprising a pair of rolling members seated in conical recesses in one of said discs to coact with the camming surfaces of the other disc.

3. Brake mechanism for vehicles of the class described comprising in combination, a support, a plurality of braking members mounted thereon, primary means, for shifting one of said members into contact with the others to produce brake application, auxiliary means for actuating said members into brake relation, comprising a pair of discs having camming surfaces, anti-friction elements between said discs, means for rotating one disc relative to the other, and independent energizing means for producing servo action upon brake application during movement of the vehicle, one of the discs of the auxiliary actuating means being formed with a transverse groove arranged tangent to an arc about the axis of the brake and providing opposed camming surfaces coacting with the anti-friction elements between said discs.

4. Brake mechanism of the class described comprising in combination, a brake housing, a rotary member to be braked in said housing, a slightly rotatable pressure plate at one side of said rotary member, primary means for actuating said pressure plate into frictional contact with said rotary member, torque-actuated means between the housing and the pressure plate for producing additional pressure of the plate against the rotary member upon rotative movement of the pressure plate, and auxiliary means for urging said plate into contact with the rotary member to be braked comprising a pair of cooperative discs between the pressure plate and the housing and having their axes displaced to one side of the axis of the pressure plate, said discs having camming surfaces on their surfaces facing each other, anti-friction members between said discs, one of said discs being fixed and the other rotatable, and means for rotating the rotary disc to shift the anti-friction members about the axes of said discs to produce a camming action urging the pressure plate into frictional contact with the rotary member to be braked.

5. Brake mechanism of the class described comprising in combination, a brake housing, a rotary member to be braked in said housing, a slightly rotatable pressure plate at one side of said rotary member, primary means for actuating said pressure plate into frictional contact with said rotary member, torque-actuated means between the housing and the pressure plate for producing additional pressure of the plate against the rotary member upon rotative movement of the pressure plate, and auxiliary means for urging said plate into contact with the rotary member to be braked comprising a pair of cooperative discs between the pressure plate and the housing and having their axes displaced to one side of the axis of the pressure plate, said discs having camming surfaces on their surfaces facing each other, anti-friction members between said discs, one of said discs being fixed and the other rotatable, and means for rotating the rotary disc to shift the anti-friction members about the axes of said discs to produce a camming action urging the pressure plate into frictional contact with the rotary member to be braked, combined with an adjustable brake disc mounted in the entrance to the housing to receive the braking stresses of the rotary member and pressure plate.

6. In a disc brake of the class described, the combination of supporting means, relatively stationary and axially shiftable braking discs thereon, and means for actuating the shiftable discs comprising a pair of camming discs having their axes displaced to one side of the first-mentioned discs, one of the camming discs being fixed and having a groove providing opposing inclined faces, and the other being rotatable and having conical recesses in its face next the grooved face of the first-mentioned camming disc, balls seated in the recesses between the camming discs and at opposite sides of their axes, and means for rotating the rotatable camming disc to shift the balls about the axes of said discs to cause them to ride up the inclined surfaces and produce braking action between the stationary and axially shiftable discs.

HOMER T. LAMBERT.